United States Patent
Waibel et al.

(10) Patent No.: US 7,845,460 B2
(45) Date of Patent: Dec. 7, 2010

(54) SUPERIMPOSED STEERING SYSTEM COMPRISING A MECHANICAL RETURN LEVEL

(75) Inventors: Gerhard Waibel, Bildstein (AT); Rene Allgäuer, Altach (AT)

(73) Assignee: Thyssenkrupp Presta AG, Eschen (LI)

( * ) Notice: Subject to any disclaimer, the term of this patent is extended or adjusted under 35 U.S.C. 154(b) by 332 days.

(21) Appl. No.: 12/088,900

(22) PCT Filed: Sep. 14, 2006

(86) PCT No.: PCT/CH2006/000496

§ 371 (c)(1),
(2), (4) Date: Apr. 1, 2008

(87) PCT Pub. No.: WO2007/038884

PCT Pub. Date: Apr. 12, 2007

(65) Prior Publication Data

US 2008/0251311 A1  Oct. 16, 2008

(30) Foreign Application Priority Data

Oct. 6, 2005  (CH) .................................. 1610/05

(51) Int. Cl.
*B62D 5/04* (2006.01)
(52) U.S. Cl. ..................................... 180/444

(58) Field of Classification Search ................. 180/443, 180/444
See application file for complete search history.

(56) References Cited

U.S. PATENT DOCUMENTS

2001/0022249 A1* 9/2001 Yoshida ...................... 180/446
2010/0004823 A1* 1/2010 Nakatsu ....................... 701/41

* cited by examiner

*Primary Examiner*—Tony H. Winner
(74) *Attorney, Agent, or Firm*—Notaro, Michalos & Zaccaria P.C.

(57) ABSTRACT

A superimposed steering system of a vehicle steering system, has an input shaft and an output shaft that are at least partially rotationally mounted on a support system fixed to the vehicle body, a servodrive comprising a rotor arranged in a coaxial manner in relation to one of the shafts and is connected in a rigid manner to a first transmission element and a locking device for selectively coupling the shafts. The first transmission element transmits the rotational speed of the rotor to the rotational speed of the input shaft, and the rotor is rotationally connected to a ferromagnetic or permanently magnetic first contact element. The coupling which is rotationally connected to the shafts can be obtained by a friction connection of a first contact element to a second contact element which is rotationally connected to the support system. The pressure force can be magnetically produced and at least one of both contact elements is arranged in a displaceable manner in the axial direction.

8 Claims, 7 Drawing Sheets

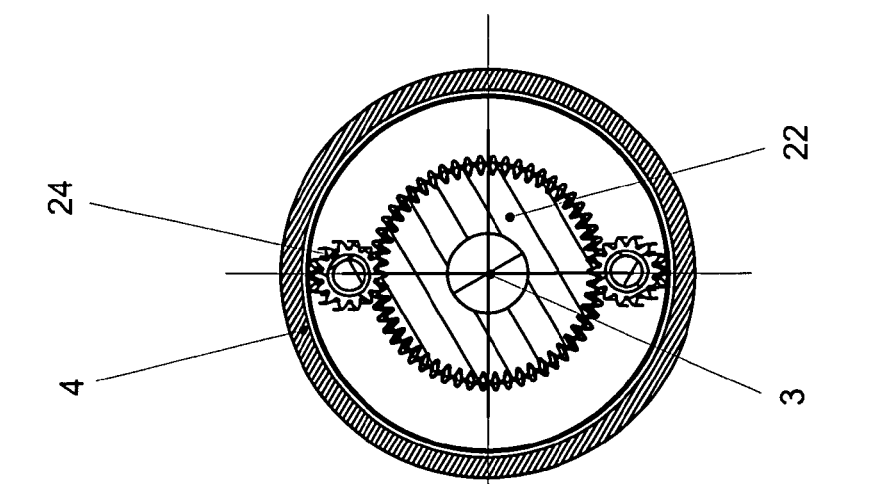
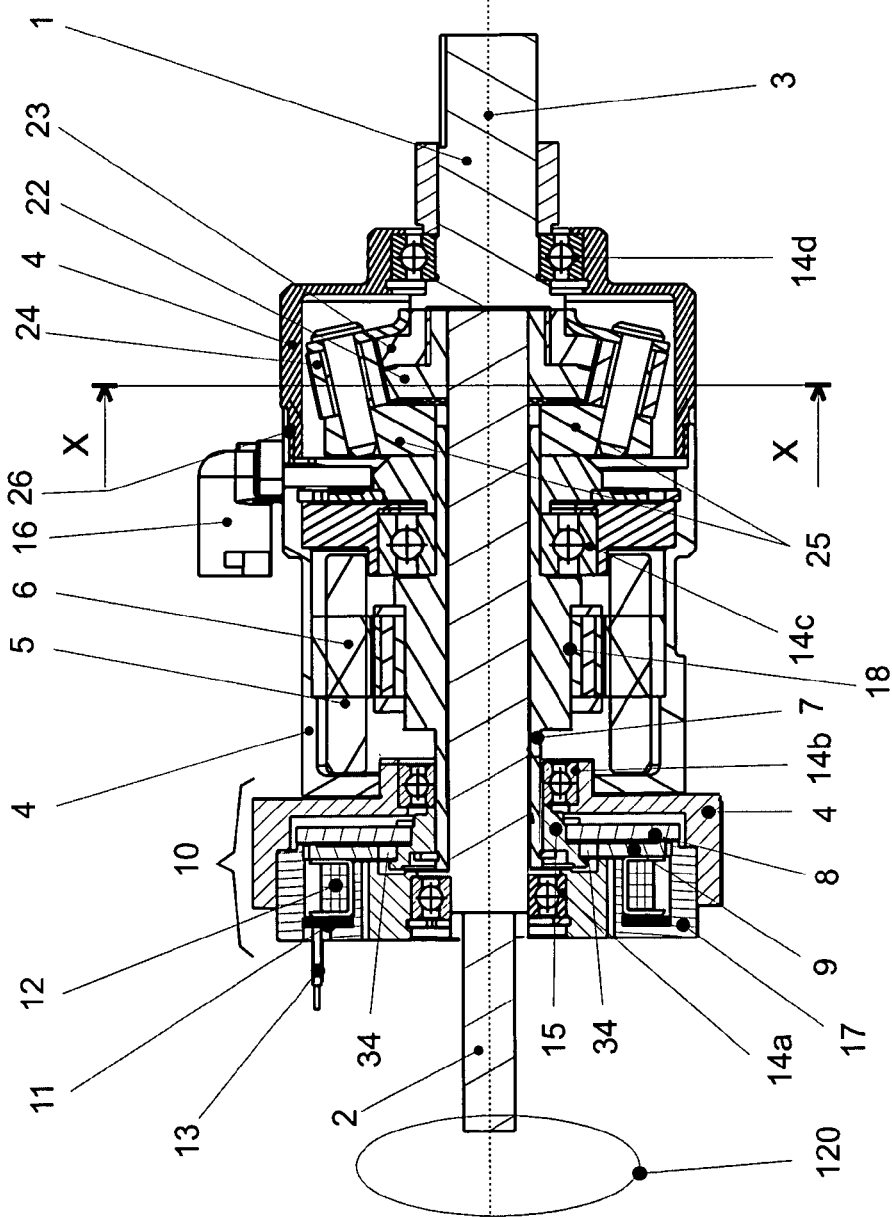
Fig. 5
Fig. 4

US 7,845,460 B2

SUPERIMPOSED STEERING SYSTEM COMPRISING A MECHANICAL RETURN LEVEL

FIELD AND BACKGROUND OF THE INVENTION

The invention relates to a rotational speed superposition device as well as to a method for operating a rotational speed superposition device.

Such motor vehicle steering mechanisms with superposition gearing are employed in modern steering systems for free-riding or non-trackbound motor vehicles. The electromagnetic auxiliary drive provided in such superposition gearings serves for superimposing rotations of the superposition gearing due to the auxiliary drive onto the steering interventions carried out through the operating person on the control wheel (steering wheel). In this manner the relation of the turning speed of the motor vehicle wheels in comparison to the turning speed of the steering wheel becomes adjustable and can be adapted to the particular driving situation. Thus, for example when parking-in, small angular changes on the steering wheel are intended to lead to large angular turnings at the wheels, while during fast freeway travel even large angular changes on the steering wheel are intended to lead only to small angular turnings at the wheels. Possibly even the automated parking-in should be made possible without turning of the steering wheel. In this manner, via the auxiliary drive, for example, corrective action can simultaneously be exerted onto steering movements, which are erroneous or too vigorous, by the motor vehicle driver. Such steering movements requiring correction can occur, for example, in overreactions of the driver in hazardous situations.

The function of a rotation speed superposition, which can also be referred to as rotational angle superposition, during the wheel-steering process is consequently decoupled compared to a force coupling or torque coupling such as serves in a power steering to facilitate the control process.

Various such devices are already known within prior art. Apart from the application of planetary gearings for the superposition of the rotational angle or rotational speed, strain wave gearings, also known by the term harmonic drive gearing or pulsator gearing, are also utilized.

In such gearings for the superposition of the rotational angle or rotational speed the input drive shaft and the output drive shaft as well as an output shaft of an auxiliary drive are each connected with a gearing member of the superposition gearing. Such gearing members are for example a toothed wheel or a planetary carrier. The superposition takes place through specific gearing structures, to some extent comprised of further gearing elements, thereby that the rotational speed of the output shaft of the auxiliary drive and the input shaft are added to appropriately predetermined rotational speed transmissions and are transferred onto the output drive shaft of the device. In addition to the rotational speeds, torques are correspondingly also transferred. A corresponding reinforcing of the torques on the auxiliary drive, and on the input and output shaft, is therefore required since otherwise the rotational speed of the input drive shaft is not transferred, as intended, onto the output drive shaft but rather onto the output shaft of the auxiliary drive. In the case of a rotational speed superposition device for a motor vehicle, this would result in the fact that the driver can no longer determine the maximum angle of turn with certainty. The locking device for the optional torsion-tight coupling between input drive shaft and output drive shaft assumes a correspondingly high importance.

EP 133 84 93 A1 and JP 200330615 A introduce a device for the rotational speed superposition for a steering system in which the rotational speed superposition takes place with a strain wave gearing. The device is herein formed integrally and rotatably with the steering shaft driven by the steering wheel and includes a drive motor whose driving rotational speed is adjustable in order to obtain the desired rotational speed superposition. In the introduced solution the housing is connected with the steering shaft and consequently rotates simultaneously. For the mechanical forced coupling of the input with the output shaft of the superposition device in the event of failure, for example in the event of power outage, a positive locking analogous to a coupling toothing is proposed, which through an axial movement of the opposing coupling sides is coupled in with spring force. The coupling is controlled through the torques engaging on the gearing from the input drive shaft connected with the control wheel or the output drive shaft connected with the wheels.

A significant disadvantage of this solution comprises that the driver must rotate with the steering wheel the entire device, including the safety coupling, when controlling the motor vehicle.

Further, DE 198 23 031 A1 introduces a rotational speed superposition device with a safety coupling for the secure and reliable torque transfer in the event of failure. In the various embodiment examples in the event of failure a pin is moved through a solenoid parallel to the axis of the input drive and output drive shaft, respectively, and the gearing is blocked. In one embodiment example a row of stud holes are provided in a suitable gearing member for the reception of the pin. In a further embodiment example, in which superposition is realized with a harmonic drive gearing, the pin is brought into engagement between the elliptic rotor and parts of the housing or alternatively between the toothings of the gearing.

To operate such devices it is reasonable or even necessary to hold the safety coupling initially in the coupled-in state during the start of the motor vehicle, since, as a rule, it cannot be ensured that sufficient energy for operating the rotational speed superposition device is immediately available.

However, the solutions indicated in prior art hold a number of disadvantages. The blocking elements of the safety coupling must abruptly brake the potentially rotating rotor of the electric motor and, in the process, transfer considerable forces such that frequent coupling in and coupling out of the coupling lead to wear or the coupling must be laid out complexly and with large installation requirements. Further, the rigidities in the torque transfer are not very high. In addition, coupling in is not possible in every angular position.

SUMMARY OF THE INVENTION

The invention addresses the problem of providing a rotational speed superposition steering for a steering system with a safety coupling which is compact and has low wear and which can be coupled in and out in every angular position.

The problem is solved through the arrangement according to the invention and to a method according to the invention. The various features of novelty which characterize the invention are pointed out with particularity in the claims annexed to and forming a part of this disclosure and are entirely based on the priority application Switzerland no. 1610/05, filed Oct. 6, 2005 and PCT/CH2006/000496, filed Sep. 14, 2006 as incorporated herein by reference.

BRIEF DESCRIPTION OF THE DRAWINGS

In the following the invention will be explained in further detail by example and with schematic figures. Therein depict.

DESCRIPTION OF THE PREFERRED EMBODIMENT

Figure 1:
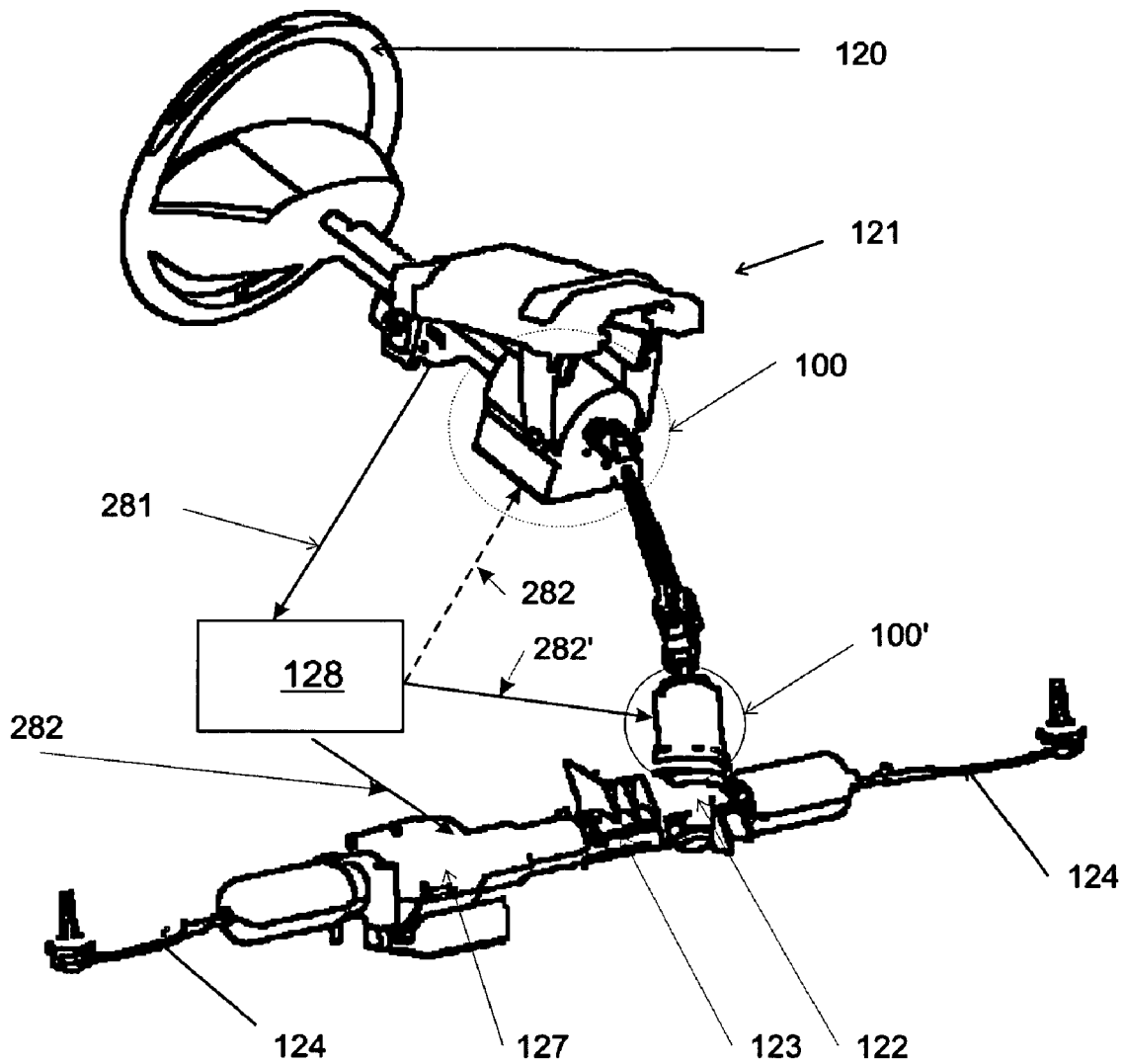
FIG. 1 a steering system for a motor vehicle.
Figure 2:
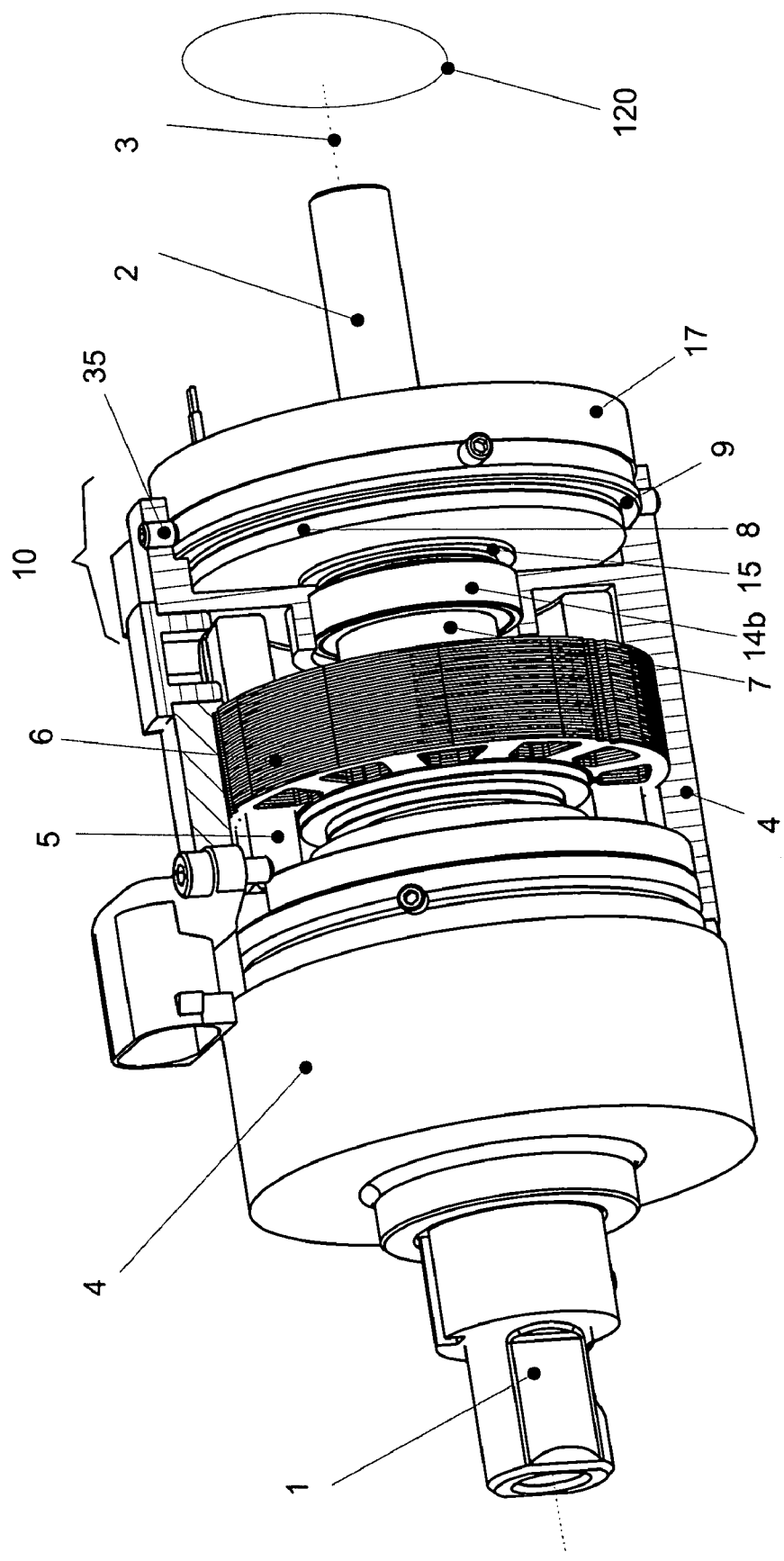
FIG. 2 an embodiment of the rotational speed superposition device in perspective representation, FIG. 3 a further embodiment of the rotational speed superposition device in axial section, FIG. 4 a further embodiment of the rotational speed superposition device in axial section, FIG. 5 a cross section along the sectional axis X-X corresponding to the embodiment according to FIG. 4, FIG. 6 a further embodiment of the rotational speed superposition device in axial section, FIG. 7 a detail view through the locking device according to segment Y from FIG. 3, FIG. 8 schematically another structure of the safety coupling.

The schematic structure depicted in FIG. 1 of a steering arrangement 129 as a steer-by-wire configuration or a steering arrangement 129 with electric power assisted booster corresponds substantially to prior art. The depicted steering arrangement comprises inter alia a steering wheel 120, a steering column 121, the steering gearing 122 and the two tie rods 124. The tie rods 124 are driven by the toothed rack 123. For the rotational speed superposition serves the superposition device 100 or 100' depending on which site of the transmission chain from the steering wheel to the tie rods the superposition gearing is to be disposed. It is also possible to integrate the superposition gearing in the steering gearing 122. This disposition of the superposition gearing is not shown in FIG. 1.

In the following the invention will be explained in further detail in conjunction with a steering system with a superposition gearing, which is to be disposed at the location denoted in FIG. 1 by the reference number 100. The superposition gearing described in the following is therefore preferably disposed between the steering wheel 120 and the steering gearing 122, for example at the site labeled in FIG. 1 with the reference number 100.

In this preferred disposition of the superposition gearing the input drive shaft 2 driven by the steering wheel 120 and the output drive shaft 1 driving the steering transmission pinion of the steering gearing 122 are located coaxially with one another, wherein the end 2a of the input drive shaft 2 and the end 1a of the output drive shaft 1 are disposed oppositely at a spacing from one another on their common axis of rotation.

In the normal case the steering movement desired by the driver is fed via a sensor system, not shown in FIG. 1, through the steering wheel 120 as a signal 281 into a control apparatus 128. In the control apparatus 128 therefrom, optionally with the aid of a sensor signal of the auxiliary drive of the steering system (not shown here) and/or of the superposition gearing and further signals describing the motor vehicle state, the appropriate control voltage 282 for the electric motor of the superposition gearing is determined and output to this motor.

The steering system, into which the superposition gearing is installed, can be laid out in the invention with or without power assisted steering booster. If a power assisted steering booster is provided, it is here irrelevant whether or not the power assisted booster of the steering system is hydraulic, pneumatic or electric.

FIG. 1 shows a corresponding rotational superposition device according to the invention. In FIGS. 2 to 7 embodiments of various gearing structures of the superposition gearing are shown. The numbering of the reference symbols are in all Figures the same for identical elements even though the individual embodiments may be different.

According to the invention, for a rotational speed superposition device for a motor vehicle steering system with an output drive shaft 1, oriented with respect to the input drive shaft 2 in the latter's axial direction, a carrier arrangement 4, which rotatably positions the output drive shaft 1 and the input drive shaft 2 such that they are at least partially bearing-supported, an auxiliary drive 5, 6, 7 with a rotor 7 connected torsion-tight with a first gearing element 19, 25, 27 and an adjustable locking device 10 forming a safety coupling, for the optional torsion-tight coupling between output drive shaft 1 and input drive shaft 2 is provided that the carrier arrangement 4 is disposed torsion-tight with respect to the car body, that the rotor of the auxiliary drive 5, 6, 7 coaxially encompasses the output drive shaft 1 and/or input drive shaft 2, that the first gearing element 19, 25, 27 transfers at a rotational speed transmission ratio less than 1 the rotational speed of the rotor 7 onto the rotational speed of the output drive shaft 1, and the rotor is torsion-tight connected with a ferromagnetic or permanent magnetic first contact element 8 concentrically enclosing the axial direction of the output drive shaft 1 and the input drive shaft 2, wherein the torsion-tight coupling between output drive shaft 1 and input drive shaft 2 is achieved through a frictional locking of the first contact element 8 with a second contact element 9, which is connected torsion-tight with the carrier arrangement 4, and the press-on force required for the frictional force is generated through a magnetic force and wherein at least one of the two contact elements 8, 9 is displaceable in the axial direction. One and/or both contact elements can advantageously alternatively in all embodiments be disks and/or elements with surface sections which are formed with corresponding conical or arcuate surfaces. The contact area is thereby increased at the same diameter and a centering function can also be achieved. The safety coupling 10 is shown in detail and in cross section in FIGS. 3, 4, 6 and 7.

The input drive shaft 2 and the output drive shaft 1 are oriented in one axis 3 with respect to one another. In the depicted embodiment on the rotor 7 of the auxiliary drive 5, 6, 7 a coupling element 15 is disposed, which displaceably supports the first contact disk 8 such that it is axially displaceable and transfers the torque. The rotor 7, coaxially encompassing the input drive shaft 2, of the auxiliary drive is rotatably bearing-supported in a roller bearing 14b in the carrier arrangement 4, here implemented as a housing. The elements of the locking device 10 or of the safety coupling can be contained as an assembly in a separate subhousing 17, which assembly is manufactured separately and mechanically connected with the carrier arrangement 4. This connection can here be completed simply via a screw-connection into inner threadings, not shown here, of the carrier arrangement 4 or via screw-connections 35. This connection can alternatively also be completed through pressing-in, adhering-in or in other ways.

In the preferred case the auxiliary drive 5, 6, 7 is laid out as an electric motor whose stator 6 is fixedly connected with the carrier arrangement 4. Depending on the embodiment of the gearing, the stator 6 encompasses coaxially the axis 3 of the input drive shaft 2 and/or output drive shaft 1. The stator 6 carries the stator windings 5. The rotor of the electric motor is equipped with permanent magnets and is set into rotation at the corresponding current feed of the stator windings 5. The electric motor is correspondingly fully integrated into the rotational speed superposition device whereby a highly compact and energy efficient layout is attained. The motor is to be laid out such that it can be actuated rotatingly in both rotational directions. Through the connection of the rotor with a gearing member of the superposition gearing, whose rotational speed is transmitted with a rotational speed transmission ratio less than 1 onto the output drive shaft 1, the electric motor can be actuated with higher rotational speed. Transmission ratios of more than 1:20 or even more than 1:50 are here especially advantageous. That means more than 20 or 50 rotor revolutions correspond to 1 rotation of the output drive shaft if the rotational speed of the input drive shaft has the value 0.

The contact disks 8, 9 are preferably produced as circular disks of steel or another ferromagnetic material. However, they may also be gapped or perforated disks which serves, for example, for better venting during the opening and closing of the two contact disks. In the embodiment example the first contact disk 8 is torsion-tight yet axially displaceably connected via a coupling element 15 with the rotor 7 of the auxiliary force device 5, 6, 7.

In the simplest case the magnetic press-on force is generated by a permanent magnet 11. The permanent magnet 11 can be developed as a cylindrical disk whose axis coincides with the axis 3 or the input drive shaft 2 or the output drive shaft 1. However, several individual permanent magnets can also be applied onto a cylindrical disk. Furthermore, for the sake of simplicity every possible embodiment is denoted as permanent magnet 11.

The first contact disk 8 is drawn onto the second contact disk 9 through the magnetic field of a permanent magnet 11. The subhousing 17 as well as a corresponding armature implementation ensure the magnetic closure. The area pressing between the two contact disks 8, 9 serves as frictional locking. To improve the frictional force, one or both of the contact disks 8, 9 can be coated with corresponding friction coatings. While a positive locking surface structure of the two contact disks 8, 9 would be obvious and conceivable, it entails, however, a number of disadvantages. In particular, in that case the locking between the two contact disks 8, 9 would no longer be possible for every relative rotational angle. Increased wear must also be assumed. In particular the braking of a potentially still ongoing rotation of the rotor 7 is hardly possible. Nevertheless, such a solution can be desirable in the individual case.

In the case of locking, the contact disks 8, 9 are in frictional contact with one another whereby the rotor 7 is blocked with respect to the carrier structure 4. Rotor 7 is furthermore connected with a first gearing element 19, 25, 27 which therewith is also blocked with respect to the body-stationary carrier structure 4. Consequently, the entire torque introduced into the input drive shaft 2, is transferred to the output drive shaft 1. Corresponding to the gearing transmissions of the particular gearing, the rotational speed of the input drive shaft is transferred to a rotational speed on the output drive shaft. Therewith the function of the torsion-tight coupling between input drive shaft 2 and output drive shaft 1 is achieved. This case is important in the event of an emergency or also when the drive motor of the motor vehicle is switched off. In this operating state the driver has the sole control over the steering of the driving direction and the steering wheel is mechanically coupled with the turned wheels. This is important in cases of lacking energy supply of the auxiliary drive, such as for example in the event of power outage, with the breakdown of a sensor or also in the event of malfunction of the actuation of the auxiliary drive. For detecting such failures, for example, sensors 16 can be integrated into the rotational speed superposition device, which make possible the monitoring of the different rotational speeds or rotational angles on input drive shaft 1, output drive shaft 2 and rotor 7.

In the case of unlocking in which the rotational speeds or rotational angles of the input drive shaft 2 and output drive shaft 1 are to be variable with respect to one another, the contact disks 8, 9 are moved out of frictional contact preferably through a small distance between them. The auxiliary drive is simultaneously supplied with energy such that it assumes the supporting of the torque introduced by the input drive shaft 2. If needed, the rotor 7 is set into rotation by the auxiliary drive in order to attain corresponding rotational speed or rotational angle superposition between input drive shaft 2 and output drive shaft 1.

To increase safety it is especially advantageous if, in the event of an unlocking on outage of the energy supply at the auxiliary drive 5, 6, 7, the switching into the case of locking, in which output drive shaft 1 and input drive shaft 2 are coupled torsion-tight, takes place quasi automatically. Additional currents, which bring about the coupling, should not be required. This process, moreover, should take place such that it is as imperceptible to the driver as is possible.

For this purpose the unlocking should preferably be brought about by a current flow, while without this current flow the system is automatically locked. In a further development of the invention this is attained thereby that the magnetic press-on force between the first and second contact element can be cancelled through an electrically actuated magnetic counterfield. In the simplest case this magnetic counterfield is generated by an encircling coil 12, which is actuated via an electric connection 13. The coil 12 is disposed in the embodiment example between the permanent magnet 11, which effects the magnetic press-on force and the contact disk 9. If the coil 12 is appropriately energized, the magnetic circle between the permanent magnets 11 is closed such that onto the first contact disk 8 no or only a very low attractive force acts in the direction of the second contact disk 9. Therewith the frictional force between the two contact disks decreases such that the locking device 10 is unlocked. Upon an outage of the power supply of coil 12 the magnetic counterfield immediately collapses such that the magnetic force of the permanent magnets 11 acts directly on the contact disk 8 and attracts it to the contact disk 9.

In a further development the energy expenditure for holding the unlocked state of the locking device 10 is to be lowered. For that purpose the locking device comprises a spring 34, whose force acts counter to the magnetic press-on force. In the embodiment example the axially displaceable contact disk 8 is pushed away from the permanent magnets 11 by means of a spring 34, as is shown schematically in the detailed FIG. 7. With increasing distance of the contact disk from the field of the permanent magnet 11 the force of attraction decreases such that the magnetic counterfield only needs to be weaker in order to cancel its effect.

However, for locking the locking device 10 through the magnetic force of the permanent magnet 11 the spring force must be overcome. For this purpose in a further development of the invention the spring force is laid out under definition. In the preferred case the spring force is dimensioned such that the force acting onto the first axially movable contact disk 8 and directed away from the other contact disk 9 in the state in which the first contact disk is raised, is in the range of slightly greater than zero up to 10% of the magnitude of the magnetic force of the magnetic field which generates the press-on force. For maintaining the unlocked state of the locking device 10 thereby only a very low power requirement is available for the magnetic counterfield. The reliable closing of the locking device is simultaneously ensured. As soon as the contact disks 8, 9 move toward one another, the magnetic force onto the movable contact disk 8 increases such that the required high frictional force is generated. With the dimensioning of the spring the bouncing during impact of the two contact disks is decreased. The briefly minimally higher power requirement for unlocking the locking device 10 is more than compensated through the saving during the entire length of holding in the unlocked state.

The locking device 10 can very well and compactly be integrated into the rotational speed superposition device. For this purpose the rotor 6 is preferably, on the one hand, rotatable supported directly in the carrier arrangement 4 and the input drive shaft 2 is rotatably supported in the part of the locking device 10 fixedly connected with the carrier system, which encompasses the second contact disk. It is especially advantageous to support the other end of the input drive shaft 2 directly in the output shaft 2.

With the aid of the rotational speed superposition device structure according to the above characteristics a rotational speed superposition device a safety redundancy for the steering, against outage of the onboard vehicle voltage or other disturbances, is provided which very rapidly and securely establishes the mechanical coupling between the steering wheel and the steered wheels. In the event of an outage of the energy supply of the auxiliary drive 5, 6, 7, of a sensor signal, or a malfunction in the steering or another disturbance of the functions of the motor vehicle, the current flow for the operation of the magnetic counterfield for cancelling the magnetic press-on force is interrupted such that the first contact disk 8 is in frictional-locking contact with the second contact disk 9 with the magnetically generated press-on force.

The application for different types of preferred superposition gearings will be explained in further detail in conjunction with FIGS. 3, 4, 5 and 6 for the description of the rotational speed superposition device for a motor vehicle steering system which, according to the invention, are coupled with a locking device 10.

Figure 3:
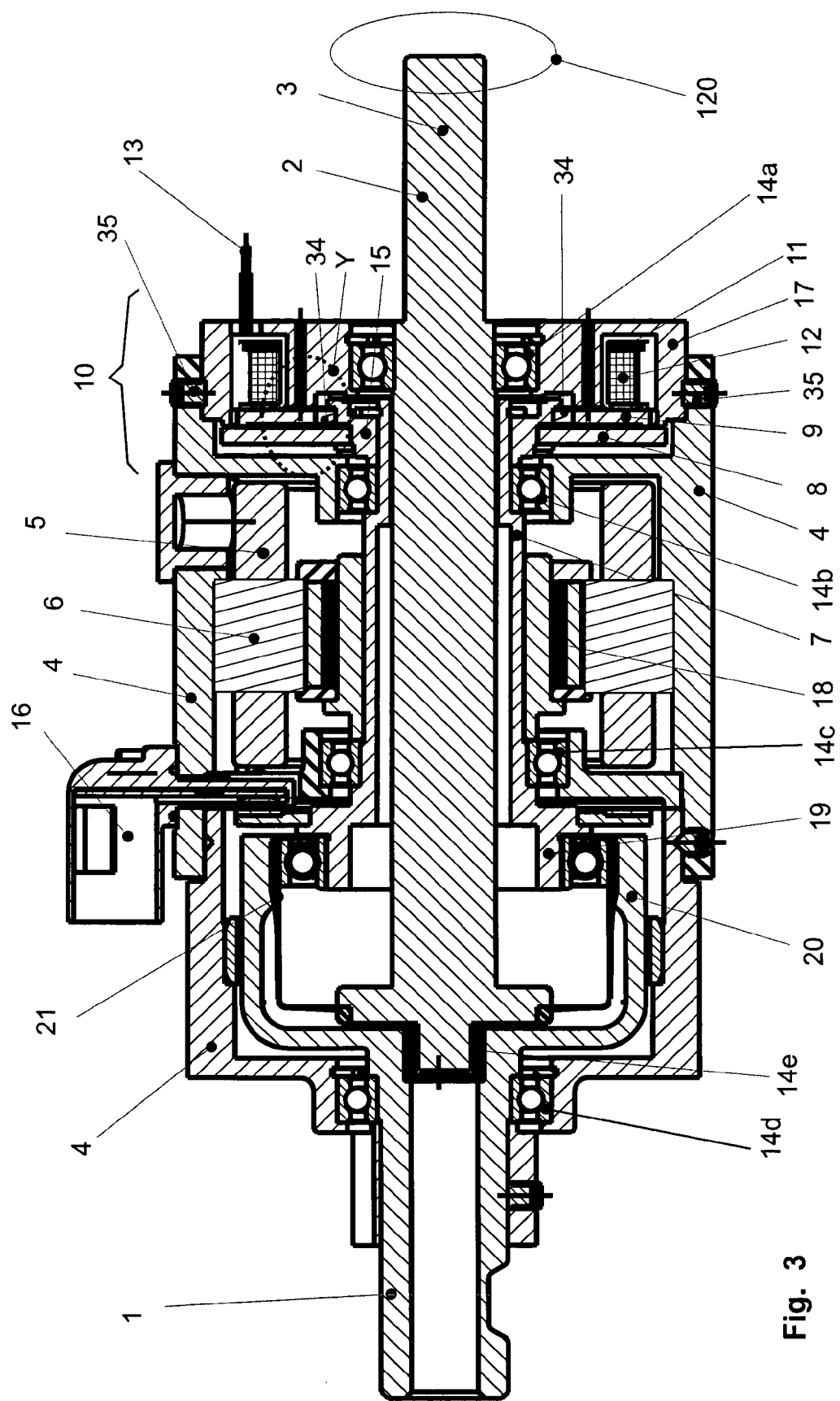

FIG. 3 depicts a preferred rotational speed superposition device together with the locking device 10 in longitudinal section. An input drive shaft 2 and output drive shaft 1 are oriented in the axial direction with respect to one another and are rotatably supported such that are rotationally movable independently of one another. The input drive shaft 2 in a steering system is interactively connected with a steering wheel 120. The carrier arrangement 4 receives the bearings 14a, 14d and 14b for the rotatable bearing support of the input drive shaft 2 and the output drive shaft 1. These shafts 1, 2 can be fully supported on the carrier arrangement. However, they can also be additionally supported outside of the carrier arrangement 4. The carrier arrangement 4 is disposed torsion-tight with respect to the chassis on the motor vehicle and does not simultaneously rotate with either of the two shafts 1, 2. The carrier arrangement 4 is advantageously implemented as a substantially closed housing 4. A rotor 7 is disposed coaxially supported about the input drive shaft 1 with respect to the housing 4 such that it is rotatably bearing supported with a bearing 14b, 14c, which is driven by the stationary encompassing stator 6 and, together, forms an electric motor. This motor is preferably implemented as an electronically commutated motor. This auxiliary drive 5, 6, 7 can, however, also be of a different type, such as for example an hydraulic motor. On the rotor 7 is disposed a wave generator 19 forming a first gearing element, which, is, for example, an oval disk on whose periphery directly or indirectly a flexible ring 21 with outer toothing is supported. On the rotor is furthermore disposed torsion-tight the first contact element 8 of the locking device 10 according to the invention, here again developed as a contact disk 8. Together with the third housing part 17, the connection to the locking device 10 is depicted, whose structure and function has previously already been described.

The outer toothing of the flexible ring 21 engages at least on two opposing peripheral points into an inner toothed wheel 20. This inner toothed wheel 20 is connection torsion-tight with the output drive shaft 1, the input drive shaft 2 being connected torsion-tight with the outer toothed flexible ring 21.

The present implementation of the rotational speed superposition device results in the fact that if the auxiliary drive 5, 6, 7 is not operated no rotational speed superposition onto the output drive shaft 1 takes place and the input drive shaft 2 is coupled 1:1 with the output drive shaft 1 via the gearing arrangement. In this case consequently the rotational movement of the steering wheel 120 or of the input drive shaft 2 is transmitted directly via the turning of the flexible ring 21, connected torsion-tight with the input drive shaft, and the tooth meshing between this flexible ring 21 and the inner-toothed internal toothed wheel 20, which is connected torsion-tight with the output drive shaft 1, without rotational speed change onto the output drive shaft 1 and thus onto the steering gearing 122. When, corresponding to the signals of the actuation electronic circuitry of the control apparatus 128, the auxiliary drive 6, 7 is set into motion, the rotor 7 is set into motion and its rotational speed, under appropriate gear reduction, is superimposed onto the output drive shaft 1 via the initially described harmonic drive gearing. The rotational speed behavior of the steering device can thus be adjusted and be actively updated with the aid of the control apparatus 128 via the present rotational speed superposition device as desired to the driving situation and the driving requirements.

In an advantageous further development the flexible ring 21 is formed in the shape of a pot and is torsion-tight connected directly with its bottom surface with the input drive shaft 2, or in an alternative embodiment with the output drive shaft 1, preferably even through a simple hammering or riveting connection or through a welding connection of the thus formed bottom with the input drive shaft 2, or in an alternative embodiment with the output drive shaft 1.

In an alternative embodiment it is also feasible to interchange the input drive and the output drive shaft with respect to each other in terms of their disposition. In this case the input drive shaft 2 is herein connected torsion-tight with the inner toothed wheel 20 and the output drive shaft 1 is connected torsion-tight with the outer toothed flexible ring 21.

The inner toothed wheel 20, whose tooth circle is preferably circular, can also be formed integrally with the output drive shaft 1, or as a separate structural part which is connected with the output drive shaft 1, is joined using plastic deformation, analogously to clinching, or through welding or soldering with the output drive shaft or through a frictional locking connection. The inner toothed wheel in an especially advantageous manner is formed in the shape of a pot. Such inner toothed wheel is in this case produced for example through sheet metal forming and punching operations and on its pot bottom connected torsion-tight with the output drive shaft.

To acquire the rotational angle state of the configuration, advantageously a rotational angle sensor 16 is provided which is connected with a control apparatus 128, which, in turn, acts onto the auxiliary drive 6, 7 for adjusting the desired rotational speed superposition behavior of the steering device. The sensor 16 can herein acquire positions of the rotor 7, of the input drive shaft 2 or of the output drive shaft 1.

Depending on the selected control algorithm, one of the signals or also the combination of the signals can herein be processed.

A further preferred rotational speed superposition device with safety coupling 10 is depicted in longitudinal section in FIG. 4 and in cross section in FIG. 5.

This rotational speed superposition device comprises the following components:

a driving device, here the input drive shaft 2, an output device, here the output drive shaft 1, an auxiliary drive comprising a stator 6 with stator windings 5, not specifically shown here, with corresponding electrical connection and a rotor 7 with permanent magnets, not specifically shown here, a carrier arrangement 4, fixed torsion-tight with respect to the body, advantageously implemented as a housing, such as, for example, comprised of at least two housing parts 4, which bearing supports the shafts 1, 2 and the rotor 7 of the auxiliary drive in bearings 14c, 14d and 14b, 14c, respectively, and supports the stator 6 of the auxiliary drive, these housing parts preferably being screwable with threadings 26, an auxiliary carrier 25 which, depending on the implementation, is developed such that it is in one piece with the rotor 7 or only connected to it torsion-tight, supports at least one further toothed wheel 24 and which forms a first gearing element, a first toothed disk 22 with outer toothing, which is disposed on the input drive shaft 2 at its input drive-end, a second toothed disk 23 disposed on the output drive shaft 2 at its output-drive end, with a further outer toothing, wherein on the rotor via a coupling element 15 the first contact element 8 of the locking device 10 according to the invention, here developed as contact disk 8, is disposed such that it is torsion-tight, the input drive and the output drive shafts 1, 2 are preferably disposed in one axis with a center of rotation 3 and the outer toothings of the two toothed disks 22, 23 are oriented parallel to one another with their tooth tips directed away from the center of rotation 3 of the rotational speed superposition device and bent at an angle to the orthogonal to this center of rotation 3 and mesh with the toothing of the at least one further toothed wheel 24. The two toothed disks 22, 23 are herein disposed at the end side and positioned at a minimal spacing from one another and their toothings extend such that they are oriented in the same direction with respect to one another and are flush with one another in the meshing region of the further toothed wheel 24. Together with the third housing part 17, the connection to the locking device 10 is depicted whose structure and function have already been described previously.

In the preferred embodiment the toothed disks 22, 23 include toothings with different tooth numbers and reference circle radii differing from one another. By reference circle radius is understood the mean value between the radius to the tip of the toothing and the radius to the foot of the toothing in the center of the toothing width. Further, each individual toothed wheel of the further toothed wheels meshes with its toothing with both toothed disks 22, 23 simultaneously.

The angle at which the toothings of the toothed disks 22, 23 is canted with respect to the orthogonal toward the center of rotation 3, is preferably between 10 and 30°. For reasons of symmetry the device is preferably laid out with two or three further toothed wheels 24.

The input drive shaft 2 is set into rotation by the steering wheel 120 and transmits its rotation onto the first toothed disk 22 at the input drive-end. Via the tooth flanks of the toothing of the further toothed wheels 24 the rotational speed, introduced from the steering wheel 120 into the toothing of the first, input drive-end toothed disk 22, is transmitted onto the toothing of the second output-drive end toothed disk 23 and therewith onto the output drive shaft 1. Under the precondition that the auxiliary carrier 25 is stationary in terms of angular position with respect to the housing 4 connected torsion-tight with respect to the body, in the rotational speed transmission from the input shaft 2 to the output shaft 1 the further toothed wheels 24 rotate about their own axis. With the aid of the locking device 10 according to the invention, in which, in the event such is needed, the rotor 7 is blocked via the contact element 8, connected with it via a coupling element 15, with the carrier arrangement 4, the auxiliary carrier 25 connected with the rotor 7 is also blocked. The output rotational speed at the output drive shaft 1 is in this case determined by the input rotational speed at the input drive shaft 2 multiplied by the quotient of the number of teeth of the toothing of the first, input-drive end toothed disk 22 divided by the number of teeth of the toothing of the second, output-drive end toothed disk 23.

When the auxiliary drive is driven, the rotational speed of its rotor 7 is transmitted to the auxiliary carrier 25 and therein the further toothed wheels 24 are set into additional rotation about their own axis. Thereby the two toothed disks 22, 23 are set into a relative turning with respect to one another, which depends on the tooth numbers of their toothings. With simple technical gearing considerations here a desired transmission ratio of the rotational speed of the auxiliary carrier 25 to the rotational speed of the output drive shaft at non-rotating input drive shaft can be laid out. However, the fundamental gearing structure permits only one rotational speed gear reduction which is advantageous in so far as the utilized electric motor can thereby be operated with a higher rotational speed, more favorable for electric motors.

The toothed disks 22, 23 can also be formed as an inner-toothed internal gear wheel. In this case the further toothed wheel rolls out on this inner toothing. However, the embodiment with outer toothed disks and rolling out of the further toothed wheel 24 on this outer toothing is preferred since therewith the structure is simplified.

As an alternative to the solution shown in the Figures, the auxiliary drive can also be coupled into the rotational speed superposition device via a gearing, belt or chain drive.

In this case the rotor or only a single or, of course, also several of the further toothed wheels 24 can be set into rotation about their own axis. Instead of the preferred embodiment as an electronically commutated electric motor, the auxiliary drive can be implemented in very simple manner as an hydraulic or pneumatic drive due to the body-stationary disposition of its stator.

In this embodiment with especially few parts, the carrier arrangements is laid out as at least a two-part housing 4, the two housing halves being screw-connected 26 with one another such that the toothings of the toothed disks 22, 23 and of the further toothed wheels 24 are meshed free of play but not seized. Thereby a compensation for play during the assembly of the rotational speed superposition device is achieved. The axial positioning by corresponding tightening of the housing screw-connection 26 takes place using measurements of the corresponding angular plays between input drive shaft 2, output drive shaft 1 as well as rotor 7 and measuring correspondingly acting torques when turning the input shaft 2, the output shaft 1 as well as of rotor 7, wherein the torques should as much as possible assume minimal values and the plays should not exceed predetermined values, for example 0.5 angular degrees.

The number of further toothed wheels 24 should be as small as possible since in each meshing of teeth of the toothings of the further toothed wheels 24 with the toothings of the two toothed disks 22, 23 the alignment of the teeth of the toothings with respect to one another must correspond, which restricts the possible tooth number differences and therewith the possible transmission ratios of the device. Thus, for example, with two further toothed wheels 24 the toothing of the first toothed disk 22 can be laid out with 54 teeth and that of the second toothed disk 23 with 56 teeth, which leads to a transmission of reciprocal value of one minus the quotient of the number of teeth of the first toothed disk 22 divided by the number of teeth of the second toothed disk 23 to the result of 27 rotor revolutions per rotation of the output drive shaft 2 at non-rotating input drive shaft 1.

If a third further toothed wheel 24 is introduced, due to the correspondence, the tooth number difference must be 3, such that the transmission ratio now leads to 18 rotor revolutions per rotation of the output drive shaft 1 at non-rotating input drive shaft 2. The tooth number of the further toothed wheel 24 is not critical for the dimensioning of the gear reduction ratio. However, in terms of the modules, the teeth must fit into the teeth of the two toothed disks 22, 23. If more than one further toothed wheel 24 is utilized, it should be disposed with advantage on the rotor or on the auxiliary carrier 25 uniformly distributed over its turning circle in order to divide the acting forces uniformly. In this case it must also be ensured in the dimensioning that with the toothings of the two toothed disks 22, 23 the meshing in each of the further toothed wheels 24 with the toothed disks is correspond.

The preferred embodiment of the rotational speed superposition device comprises additionally a rotational speed or rotational angle measuring device 16 and the arrangement according to the invention with a safety coupling 10.

Figure 6:
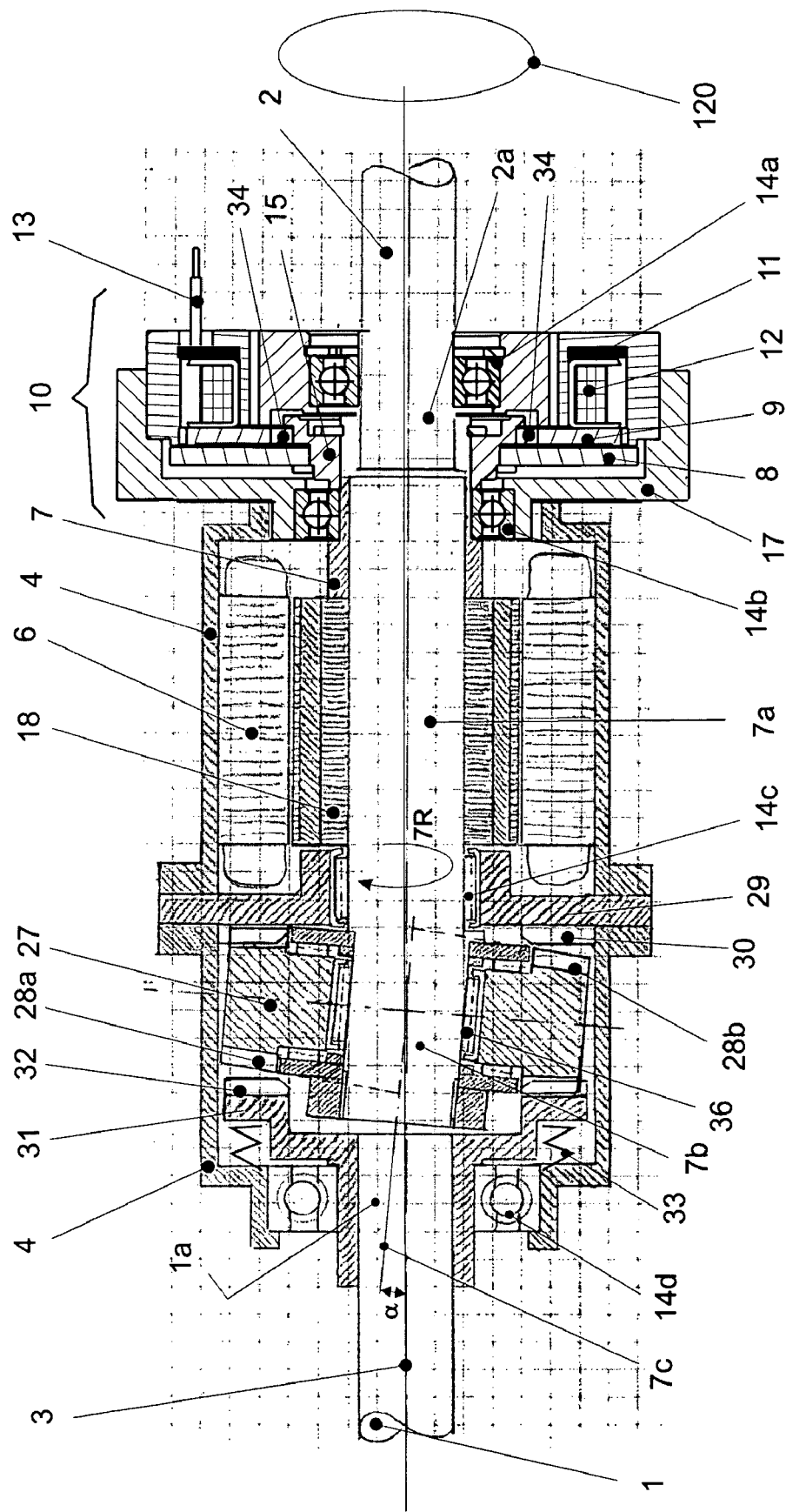
Figure 7:
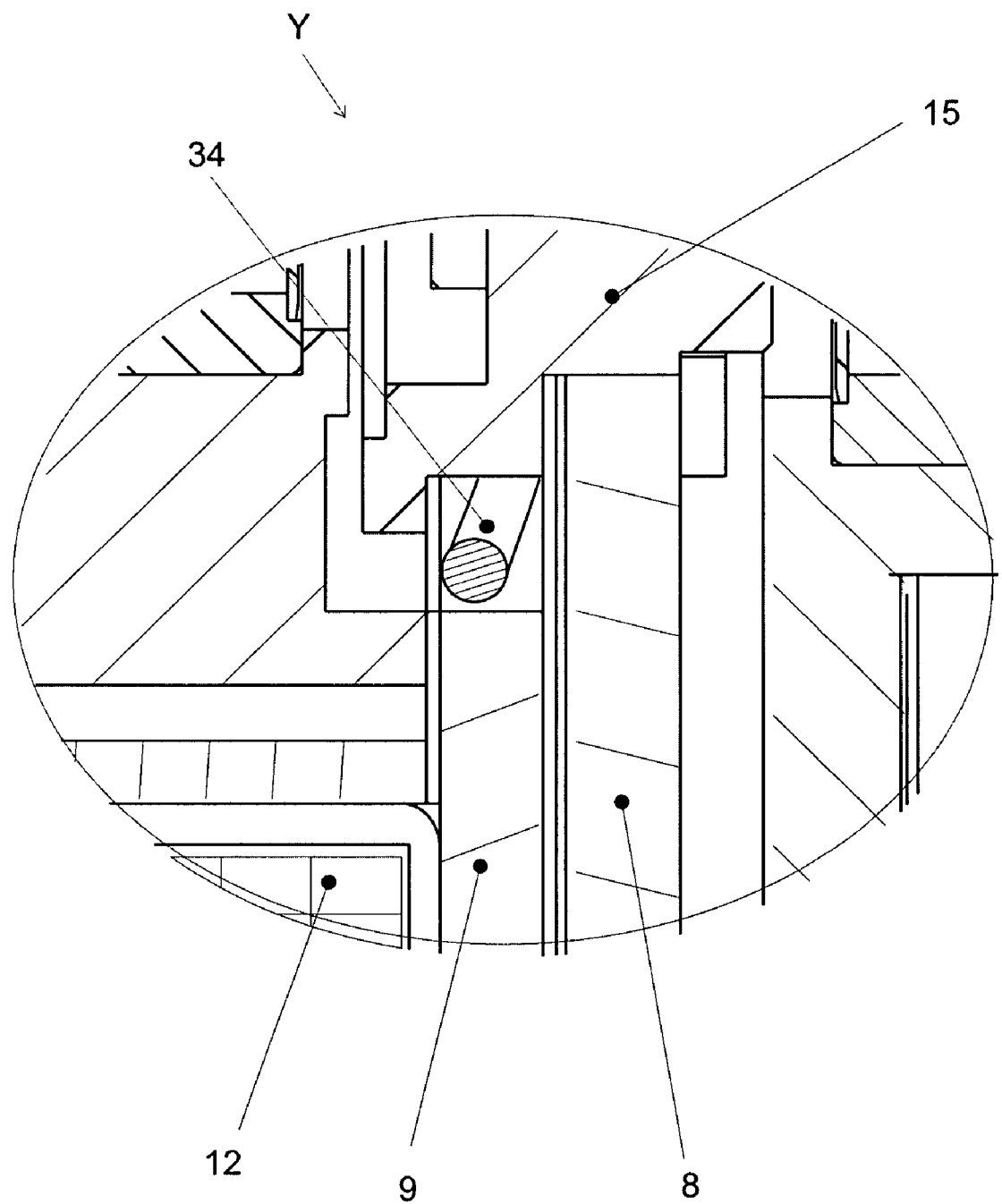

FIG. 6 depicts a further preferred embodiment of the rotational speed superposition device according to the invention in axial half section. The housing 4 comprised of two housing halves encompasses an auxiliary drive of a stator 6 and a rotor 7. The stator 6 is connection torsion-tight with the housing or the housing parts 4. Into the one housing part projects the shaft end 1a of the output drive shaft 1. On the shaft end 1a is disposed torsion-tight a toothed disk 31. Via a sleeve-form axial extension of the toothed disk 31, which is coaxial with respect to the shaft end 1a, the output drive shaft 1, together with the toothed disk 31, is bearing supported via a roller bearing 14d such that it is rotatable with respect to housing 4. The toothed disk 31 has at its periphery a toothing 32 facing away from shaft end 1a and facing toward a swashplate or wobble yoke 27.

Coaxially with the output drive shaft 1 is disposed an input drive shaft 2, which is connected torsion-tight with the housing 4 or one of the housing parts. The housing parts include at their ends facing one another flanges extending in the radial direction.

Between these flanges and connected with them under force and/or form-fit and/or material positive locking is a second toothed disk 30. The second toothed disk 30 comprises a toothing directed in the direction toward shaft end 1a of the output drive shaft 1 and toward the wobble yoke 27. In the radial direction extends the second toothed disk 30 up to the cylindrical section of rotor 7a. At its end facing the rotor 7 the second toothed disk 30 comprises an axial flange. Between this flange and the cylindrical section of rotor 7 is disposed a needle bearing 14c. At the end, facing the shaft end 2a of the input drive shaft 2, of rotor 7 is disposed a roller bearing 14b. Via the roller bearing 14b and the needle bearing 14c the rotor 7 is bearing supported such that it is rotatable relative to toothed disk 30.

It is apparent that the axial flange of the toothed disk 29 and toothed disk 30 can also be fabricated as separate structural parts and be subsequently connected.

At the end of rotor 7 facing the output drive shaft 1 is provided a second cylindrical section 7b of the rotor, which, with respect to the first cylindrical section 7a, is canted by an angle $\alpha$ (wobble angle $\alpha$) and forms the wobble axis 7c. On this second section 7b is disposed a wobble yoke 27a—the first gearing element of the rotational speed superposition device—which includes two circumferential toothings 28a, 28b. Through this disposition of the wobble yoke 27a on the angled-off section 7b of rotor 7, the toothings 28a, 28b of the wobble yoke 27 at the periphery come into engagement at opposing sides with the first toothed disk 31 and the second toothed disk 30. In this manner, the toothed disks 30, 31 are coupled with one another in terms of drive via the wobble yoke 27.

Torsion-tight connected with the housing 4 is the stator 6 of an electric motor which effects the rotational speed transmission ratio. The electric motor is preferably excited by means of permanent magnets 18. Rotor 7 of the electric motor actuates the wobble yoke 27, which with its toothings 28a, 28b mediates the force transfer between the two toothed disks 30, 31 of the input drive shaft 2 and of the output drive shaft 1. The tooth meshing of the wobble yoke 27 on the periphery changes depending on the rotational angle of rotor 7.

The wobble yoke 27 is rotatably bearing supported on the angled-off section 7b of rotor 7 via rollers or a needle bearing 36. Due to the disposition of the wobble yoke 27 on the angled-off section 7b of rotor 7b, a turning of the wobble yoke 27 occurs when rotor 7b is set into rotation. If, for example, rotor 7 is rotated in the direction of arrow 7R, the wobble yoke 27 rotates in the same direction. The tooth meshing between the second toothed disk 30 and the toothing 28b of the wobble yoke 27 migrates in the circumferential direction into the plane of drawing.

The first toothed disk 31 and the second toothed disk 30 differ with respect to their tooth number. Thereby is attained that the one toothed disk, due to the rotation of the wobble yoke 27, rotates faster than the other toothed disk such that the high transmission ratios typical for such wobble gearing are attained.

For the compensation of play a compression spring 33 can be integrated into the arrangement, which presses the two toothed disks 30, 31 and the wobble yoke together.

At the end, facing the input drive shaft 2, of rotor 7 a coupling element 15 is fastened which bears the first contact disk 8. Together with the third housing part 17, the connection to the locking device 10 is shown whose structure and function are depicted at the top.

Figure 8:
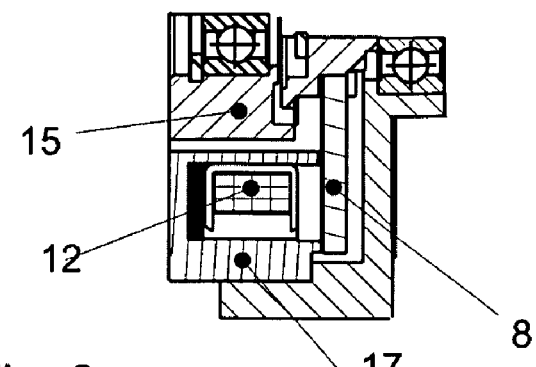

In FIG. 8 an alternative embodiment for the safety coupling is depicted in which the contact disk 8 is directly brought into contact with the subhousing 17 embodied as a yoke. The second contact element or the second contact disk is here to be considered as a component of the subhousing 17.

Figure 9:
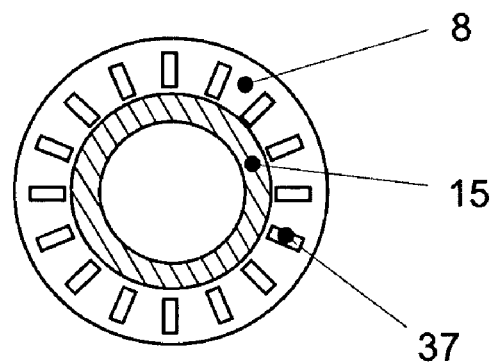
FIG. 9 and FIG. 10 show two embodiments for the contact disk.
Figure 10:
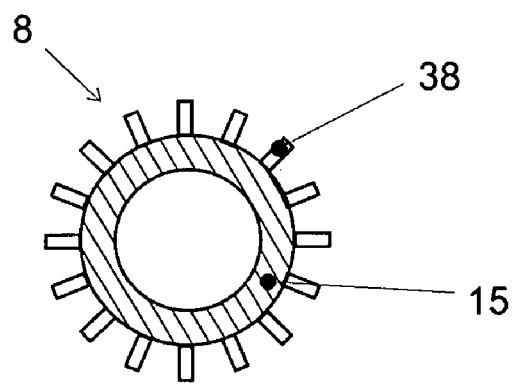

The contact disk 8 can be designed in all embodiments as a cylindrical disk. For better venting during the closing of the two contact faces, it is however of advantage to lay out the contact disk 8 with corresponding recesses 37 (cf. FIG. 9). Alternatively, a number of contact elements 38 (cf. FIG. 10) can also be connected directly with the coupling element 15. The form of the recesses 37 or contact elements 38 of the contact disk 8 are to be adapted to the particular constructional conditions. It is important that an adequate magnetic attractive force to the second contact element 9 is attained, such as for example the second contact disk 9 or the subhousing 17, which, on its surface directed toward the contact disk 8, itself can have a corresponding friction coating.

Even if in all embodiments roller bearings are shown, it is conceivable and feasible to utilize friction bearings. While in general with roller bearings lower friction values are achieved, friction bearings are more cost-effective and require less installation space. The decision will be made depending on the requirements of installation space and energy deployment for the auxiliary drive.

The rotational speed superposition device thus introduced is operated in motor vehicle steering systems in such manner that in the event of an outage of the energy supply of the auxiliary drive, or another disturbance of the functions of the motor vehicle, the power flow for the operation of the magnetic counterfield for cancelling the magnetic press-on force is interrupted such that the first contact disk 8 is in frictionally locked contact with the second contact disk 9 with magnetically generated press-on force. Thereby immediately a torsion-tight coupling between the input drive shaft 2 and the output drive shaft 1 is attained.

It is in this case desirable to complete the coupling within the shortest possible time and in such manner that it is as imperceptible as possible to the driver. In addition to energy outage of the energy supply of the auxiliary drive system or in the motor vehicle, a sensor breakdown, a problem with the actuation or a software error or other errors are also conceivable as error cases. For example through a simple cable break the measured value of the speed of the motor vehicle can no longer be transmitted correctly to the control of the superposition regulation. Therewith the control can no longer decide at which rotational speed superposition the device is to be operated. In such a case, which is readily detectable, sufficient energy is available to attain actively the torsion-tight coupling between output drive shaft 1 and input drive shaft 2.

In a preferred further development of the invention the coil for the magnetic counterfield, with which the magnetic field of the permanent magnet 11, which effects the locking device 10 for the optional torsion-tight coupling between output shaft 1 and drive shaft 2, is cancelled, is at least for a time switched such that the magnetic contact pressing force between the two contact disks 8, 9 is increased. Thereby an accelerated closing of the locking device is effected. After the torsion-tight coupling of the output shaft 1 and the drive shaft 2 is reached, the current feed of the coil 12 for the magnetic counterfield can be switched off.

In all of the embodiments of the rotational speed superposition device shown, the output shaft 1 can also be interchanged with the input drive shaft 2.

Other gearing configurations, such as for example planetary gearings are also feasible for application in the steering arrangements in combination with the previously shown safety coupling arrangement.

The invention claimed is:

1. Rotational speed superposition device for a motor vehicle steering system comprising: an output drive shaft (1) oriented with respect to an input drive shaft (2) in an axial direction of the output drive shaft, a fixed carrier arrangement (4) which rotatably supports the output drive shaft (1) and the input drive shaft (2) so that the output drive shaft and the input drive shaft are at least partially bearing supported, an auxiliary drive (5, 6, 7) with a rotor (7), connected torsion-tight with a first gearing element (19, 25, 27) and an adjustable locking device (10) for a selectable torsion-tight coupling between the output drive shaft (1) and the input drive shaft (2), wherein the carrier arrangement (4) is stationary with respect to a body of the motor vehicle, the rotor of the auxiliary drive (5, 6, 7) being coaxial to at least one of the output drive shaft (1) and the input drive shaft (2), the first gearing element (19, 25, 27) having a rotational speed transmission ratio of less than 1 and transmitting a rotational speed of the rotor (7) onto rotational speed of the output drive shaft (1), and the rotor (7) being connected torsion-tight with a ferromagnetic or permanent magnetic first contact element (8) concentrically encompassing the axial direction of the output drive shaft (1) and input drive shaft (2), wherein the selectable torsion-tight coupling between output drive shaft (1) and input drive shaft (2) is attained through a frictional locking of the first contact element (8) with a second contact element (9) connected torsion-tight with the carrier arrangement (4) and a press-on force required for the friction force is generated through a magnetic force and wherein at least one of the two contact elements (8, 9) is displaceable in the axial direction, the locking device (10) being a separate compact unit arranged in a separate housing part (17) and being separate from the first gear element (19, 25, 27) and the auxiliary actuator drive (5, 6, 7), the auxiliary drive (5, 6, 7) being between the first gear element (19, 25, 27) and the locking device (10) with respect to the input drive shaft (2), and a coupling element (15) between the rotor (7) and the first contact element (8) for non-rotatable coupling between the rotor (7) and the first contact element (8).

2. Rotational speed superposition device for a motor vehicle steering system as claimed in claim 1, wherein the magnetic press-on force between the first and the second contact element can be cancelled by an electrically.

3. Rotational speed superposition device for a motor vehicle steering system as claimed in claim 1, wherein the locking device comprises a spring (34) whose force acts counter to the magnetic press-on force.

4. Rotational speed superposition device for a motor vehicle steering system as claimed in claim 3, wherein the spring force is of such dimension that a force acts on the first axially movable contact element (8) that is directed away from the other contact element (9) in the state in which the other contract element is raised from the first contact element in the range from minimally greater than zero up to 10% of the magnitude of the magnetic force of the magnetic field which generates the press-on force.

5. Rotational speed superposition device for a motor vehicle steering system as claimed in claim 1, wherein the rotor (7) is, on the one hand, rotatably supported directly in the carrier arrangement (4), that the input drive shaft (2) is rotatably supported in the output drive shaft (1) and in the part of the locking device (10) fixedly connected with the carrier arrangement, which part comprises the second contact element.

6. Rotational speed superposition device for a motor vehicle steering system as claimed in claim 1, wherein the auxiliary drive (5, 6, 7) is an electric motor whose stator (6) is fixedly connected with the carrier arrangement (4).

7. Rotational speed superposition device for a motor vehicle steering system as claimed in claim 6, wherein the stator (6) coaxially encompasses the axis (3) of the input drive shaft (2) and output drive shaft (1).

8. Rotational speed superposition device for a motor vehicle steering system as claimed in claim 1, wherein the magnetic press-on force between the first and the second contact element can be cancelled by an electrically actuated magnetic counterfield and that at least one of the contact elements (8, 9) is developed in the form of a disk or cone.

* * * * *